(12) United States Patent
Briem et al.

(10) Patent No.: US 6,246,691 B1
(45) Date of Patent: Jun. 12, 2001

(54) METHOD AND CIRCUIT CONFIGURATION FOR THE TRANSMISSION OF MESSAGE UNITS IN MESSAGE STREAMS OF DIFFERENT PRIORITY

(75) Inventors: Uwe Briem, Maisach; Eugen Wallmeier, Eichenau, both of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/515,175

(22) Filed: Feb. 29, 2000

Related U.S. Application Data

(63) Continuation of application No. PCT/DE98/02386, filed on Aug. 14, 1998.

(51) Int. Cl.[7] .................................................. H04J 3/00
(52) U.S. Cl. .......................... 370/412; 370/395; 370/429; 370/444; 370/455
(58) Field of Search ................................... 370/235, 363, 370/368, 374, 383, 395, 396, 412, 413, 415, 417, 428, 429, 444, 535, 437, 443, 455

(56) References Cited

U.S. PATENT DOCUMENTS

| | | | |
|---|---|---|---|
| 5,121,383 | * 6/1992 | Golestani | 370/412 |
| 5,231,633 | 7/1993 | Hluchyj et al. | 370/94.1 |
| 5,268,900 | * 12/1993 | Hluchyj et al. | 370/412 |
| 5,920,572 | * 7/1999 | Washington et al. | 370/535 |
| 5,926,478 | * 7/1999 | Ghaibeh et al. | 370/395 |

FOREIGN PATENT DOCUMENTS

| | | | |
|---|---|---|---|
| 195 48 985 A1 | 7/1997 | (DE) | H04L/29/02 |
| 197 05 789 A1 | 9/1998 | (DE) | H04L/12/56 |

OTHER PUBLICATIONS

"Queueing Disciplines for Integrated Fast Packet Network" (Hluchyj et al.), IEEE 1992, pp. 990–996.
"Methodologies for Bandwith Allocation, Transmission Scheduling, and Congestion Avoidance in Broadband ATM Networks", (Sriram), 8213 Computer Networks 26, Sep. 1993, No. 1, pp. 43–59.

* cited by examiner

Primary Examiner—Douglas Olms
Assistant Examiner—Shick Hom
(74) Attorney, Agent, or Firm—Herbert L. Lerner; Laurence A. Greenber; Werner H. Stemer

(57) ABSTRACT

A method and a circuit configuration for the transmission of message units in message streams of different priority include passing the message units which are respectively associated with the message streams through a queue that is specific to the message stream. The queues are combined to form groups to ensure a throughput guarantee for the message streams in addition to observing the priorities. At least two of the groups in each case are combined to form a partner group. The groups which belong to a partner group are controlled in such a manner that, in the case where no message unit can currently be transmitted from one of the queue groups, the transmission capability is transferred from the relevant queue group to one of the remaining groups in the respective partner group.

6 Claims, 1 Drawing Sheet

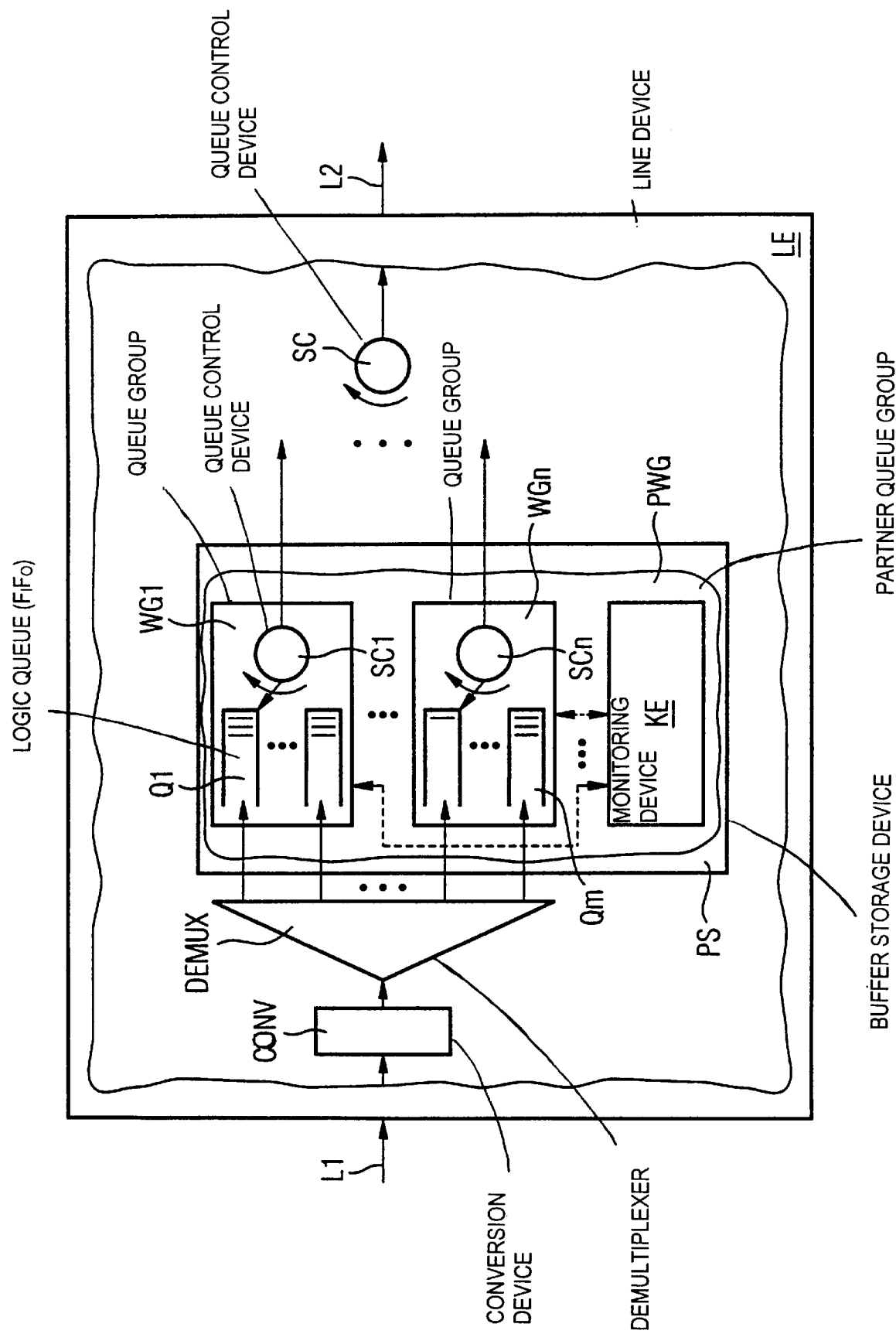

US 6,246,691 B1

METHOD AND CIRCUIT CONFIGURATION FOR THE TRANSMISSION OF MESSAGE UNITS IN MESSAGE STREAMS OF DIFFERENT PRIORITY

CROSS-REFERENCE TO RELATED APPLICATION

This application is a continuation of copending international Application No. PCT/DE98/02386, filed Aug. 14, 1998, which designated the United States.

BACKGROUND OF THE INVENTION

Field of the Invention

The invention relates to a method and a circuit configuration for the transmission of message units associated with message streams of different priority, jointly through one transmission channel. Such a method and such a circuit configuration are already known from German Published, Non-Prosecuted Patent Application DE 197 05 789 A1.

That method and that circuit configuration are intended to solve the problem of allowing the transmission lines in an ATM system and the buffer storage devices respectively associated therewith to be utilized efficiently. To that end, the invention provides that, in the case of a buffer storage device which is filled to a specific level, when a message cell which is associated with a virtual connection of relatively high priority arrives on the respective transmission line, one or more of the message cells (which are currently stored in the buffer storage device) of a selected virtual connection of low priority is or are discarded as a function of the number of lower priority stored message cells for that virtual connection.

U.S. Pat. No. 5,268,900 discloses a method for the transmission of message units which are associated with message streams of different priority and traffic class, jointly through one transmission channel. In that method:

the message units associated with the respective message stream each pass through a queue which is specific to the priority and traffic class;

the queues are combined on the basis of their traffic classes to form queue groups; and the queue groups are each controlled by a separate queue control device in such a manner that queues are combined to form partner queue groups which are specific to the traffic class, where they have priorities that differ for the same traffic class.

An article entitled "Methodologies for bandwidth allocation, transmission scheduling, and congestion avoidance in broadband ATM networks", by K. Sriram, in Computer Networks and ISDN Systems 26, 1993, pages 43–59 discloses an operating strategy for message streams of different priority through a joint transmission channel. In that device, a plurality of queues are controlled on the basis of their priority in such a manner that one queue is exclusively prioritized with respect to the remaining queues, in that transmission of message units from one of the remaining message units is allowed only in the case where no message units can be transmitted from that queue with maximum priority.

SUMMARY OF THE INVENTION

It is accordingly an object of the invention to provide a method and a circuit configuration for the transmission of message units in message streams of different priority, which overcome the hereinafore-mentioned disadvantages of the heretofore-known methods and devices of this general type and which additionally ensure throughput guarantees while taking account of priorities for the message streams.

With the foregoing and other objects in view there is provided, in accordance with the invention, a method for the transmission of message units associated with message streams of different priority, jointly through one transmission channel, which comprises passing message units associated with a respective message stream through a queue specific to the message stream; combining the queues on the basis of priorities of the message streams each passing through them to form queue groups; controlling each of the queue groups with a separate queue control device, for combining at least each two of the queue groups to form a partner queue group; and controlling the queue groups associated with a partner queue group for transferring a transmission capability from a relevant queue group to one of remaining queue groups in the respective partner queue group, if no message unit can currently be transmitted from one of the queue groups.

In accordance with another mode of the invention, there is provided a method which comprises transmitting the message units in the form of message cells in the course of virtual connections, by using an asynchronous transfer mode; and assigning one of the queues to each of the virtual connections.

In accordance with a further mode of the invention, there is provided a method which comprises transmitting the message units in the form of data packets in the course of message streams, by using a packet-switching principle, and assigning one of the queues to each of the message streams.

In accordance with an added mode of the invention, there is provided a method which comprises combining the queues through which message streams of equal priority pass, to form queue groups.

With the objects of the invention in view, there is also provided a circuit configuration for the transmission of message units associated with message streams of different priority, jointly through one transmission channel, the circuit configuration comprising queues each being specific to a respective message stream for conducting message units associated with the respective message stream; queue groups formed of the queues combined on the basis of priorities of the message streams each passing through them; separate queue control devices for controlling each of the queue groups; at least two of the queue groups each combined to form a partner queue group; and a monitoring device for controlling the queue groups belonging to a partner queue group, to transfer a transmission capability from a relevant queue group to a remaining queue group in the respective partner queue group, if no message unit can currently be transmitted from one of the queue groups.

The invention in this case results in the advantage that the following performance features can be provided with relatively little control complexity and with relatively little circuit complexity:

1. Individual minimum bit rates are guaranteed for each message cell stream irrespective of its priority.
2. A bit rate which exceeds the sum of the throughput guarantees is allocated strictly on the basis of the priority of the message cell streams, that is to say the message cell streams of high priority (1) are assigned first, and if there are none of these to be transmitted, only then are the message cell streams of lower priority (2) assigned.
3. If the minimum bit rate is not fully utilized by one of the message cell streams, then this bit rate can be made available to other message cell streams.

Other features which are considered as characteristic for the invention are set forth in the appended claims.

Although the invention is illustrated and described herein as embodied in a method and a circuit configuration for the transmission of message units in message streams of different priority, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing.

BRIEF DESCRIPTION OF THE DRAWING

The FIGURE of the drawing is a schematic and block diagram of a circuit configuration according to the invention.

DETAILED OF THE PREFERRED EMBODIMENTS

Referring now in detail to the single FIGURE of the drawing, there is seen, as an example, a line device LE which is inserted between two transmission line sections L1 and L2 in an ATM system operating by using an asynchronous transfer mode. In this case, the only circuit elements of the line device LE which are shown are those which are required for an understanding of the present invention. Furthermore, this line device is shown as being representative of other line devices inserted into transmission line sections in the ATM system.

In general, the following text does not describe the general ATM principle in any more detail, since that is well known.

Message cells occur on the transmission line section L1 and, in a known manner, have an external header in addition to an information part (user part). In this case, among other details, such an external header contains the association with a specific virtual connection. A virtual connection may either be a virtual channel connection (individual connection) or a virtual path connection (bundle of a plurality of individual connections). A virtual channel connection in this case is assigned a virtual channel number VCI (virtual channel identifier) while, in contrast, a virtual path connection is assigned a virtual path number VPI (virtual path identifier) in the external header of the respective message cell. In the case of a virtual path connection, a virtual channel number VCI is also specified in the external cell header, in order to allow the individual virtual channel connections carried within the virtual path connection to be identified.

An input of the line device LE shown in the FIGURE is formed by a conversion device CONV. This conversion device CONV now places an internal cell header in front of each message cell that occurs on the transmission line section L1, in order to allow the respective message cell to be passed on within the ATM system. This internal cell header is formed on the basis of the content of the external cell header contained in each of the message cells. In this case, one of m queue identifications QID is assigned statistically on the basis, inter alia, of the VCI or VPI/VCI contained in the respective external cell header. The respective queue identification QID results in an address reduction with respect to the associated VCI or VPI/VCI, and is included in the associated internal cell header.

The message cells, which have had an internal cell header added to them in this way, are fed successively to a demultiplexing device DEMUX which is connected to a buffer storage device PS through m demultiplexing outputs. The demultiplexing outputs are individually assigned to the queue identifications QID.

The buffer storage device PS has a large number of memory locations from which a maximum of m logic queues can be formed, as will be explained in more detail in the following text. These logic queues, which are denoted by reference symbols Q1 to Qm in the drawing, are actuated individually by the demultiplexing device DEMUX with the aid of the queue identifications QID contained in the received message cells. Upon such an actuation of a logic queue, the message cell provided with the current queue identification is transferred to this logic queue. The individual logic queues in this case are each formed by a FIFO memory (first-in-first-out memory) which can simultaneously buffer-store a plurality of message cells.

The logic queues Q1 to Qm are combined to form queue groups, for example on the basis of the priorities defined for the virtual connections. These queue groups, which are denoted by reference symbols WG1 to WGn in the drawing are, for example, each assigned to one of n priorities, and are actuated by a queue control device SC. However, since this queue control device SC is not the subject matter of the present invention, it will not be described in any more detail.

Each of these queue groups in this case is controlled by a separate queue control device SCx, where x=1, . . . ,n ("Scheduler"). In this case, queues which have been combined to form a queue group X are actuated by the associated queue control device SCx on the basis of predetermined cell scheduling. In the process, one message cell is taken from each logic queue in such a control cycle, and is passed on in the direction of the transmission line section L2 shown in the drawing.

Furthermore, in the exemplary embodiment, a plurality of queue groups in each case are combined to form a partner queue group. As an example, the drawing in this case shows the queue groups WG1 to WGn jointly forming such a partner queue group PWG. In general, the queue groups which are assigned to one partner queue group in this case have different priorities, but this is not a requirement.

Each queue group (WG1 to WGn) in a partner queue group (PWG) is activated by a non-illustrated high-level control device to transmit message cells at a bit rate (cell rate) Rx in the direction of the transmission section L2. At least two of these bit rates Rx are not equal to zero.

Furthermore, the queue groups (WG1 to WGn) associated with a partner queue group (PWG) are jointly assigned a monitoring device KE, in which case bi-directional communication links for control purposes that have not yet been mentioned exist between this monitoring device KE and each of the queue groups. This is indicated in the drawing by a dashed connection line.

The object of the monitoring device KE, in the situation where a queue group cannot currently transmit a message cell, even though this queue group has been activated to do so by a non-illustrated higher-level device, is to transfer this transmission capability in accordance with a predetermined priority algorithm to another queue group within the partner queue group. In general, the situation where a queue group cannot currently transmit a message cell may be due to the fact that there are no more message cells stored in the queues assigned to this queue group or, based on the scheduling of the queue control device (SC1 . . . SCn) assigned to the relevant queue group, it is not permissible to transmit a message cell since, otherwise, a message cell stream would exceed a maximum permissible peak bit rate, for example.

The following text shows how the following transmission characteristics can be implemented, as an example, by using the method according to the invention and the line device LE according to the invention as illustrated in the drawing:
1. Individual minimum bit rates are guaranteed for each message cell stream irrespective of its priority.
2. A bit rate which exceeds the sum of the throughput guarantees is allocated strictly on the basis of the priority of the message cell streams. In other words, the message cell streams of high priority (1) are assigned first, and if there are none of these to be transmitted, only then are the message cell streams of lower priority (2) assigned.
3. If the minimum bit rate is not fully utilized by one of the message cell streams, then this bit rate can be made available to other message cell streams, which can also be assigned to another queue group.

The following assumptions are made in order to illustrate this example:
1. There are only two queue groups, with the queue group WG1, on one hand, having a high priority, while the queue group WG2, on the other hand, has a low priority.
2. R1=50 Mbit/s is greater than the sum of the throughput guarantees for the high-priority message cell streams.
3. R2=20 Mbit/s is identical to the sum of the throughput guarantees for the low-priority message cell streams.
4. Both queue groups WG1 and WG2 operate by using the "Weighted Fair Queuing (WFQ)" method.
5. If WG1 has no more buffered message cells, the capability to transmit a message cell is transferred to WG2, and vice versa.

This results in the following behavior, that is to say a group WGX is assigned a minimum rate Rx as a transmission capability. The resultant arrival rate of all respective high-priority and low-priority message cell streams together in this case is denoted by reference symbols A1 and A2, respectively:
1. A1>R1, A2>R2: high-priority cell streams are jointly assigned R1=50 Mb/s, and low-priority cell streams are assigned R2=20 Mb/s
2. A1>R1, A2<R2: high-priority cell streams are jointly assigned R1+(R2−A2), and low-priority cell streams are assigned A2
3. A1<R1, A2>R2: high-priority cell streams are jointly assigned A1, and low-priority cell streams are assigned R2+(R1−A1)
4. A1<R1, A2<R2: high-priority cell streams are jointly assigned A1, and low-priority cell streams are assigned A2

The present invention has been described above by using the example of a line device in an ATM system. However, this invention is not limited to such systems. In fact, it can be used generally in systems in which message units which are associated with message streams of different priority are transmitted jointly through a physical or logic transmission channel. In doing so, the message units associated with the respective message stream pass through a queue which is specific to the message stream. As an example other than an ATM system as mentioned above, a system operating by using the packet-switching principle should be mentioned herein, in which message units are transmitted in the form of data packets.

We claim:

1. A method for the transmission of message units associated with message streams of different priority, jointly through one transmission channel, which comprises:

for each respective message stream of at least two of the message streams, passing message units associated with the respective message stream through a queue specific to the respective message stream;

combining the queues on the basis of priorities of the message streams each passing through them to form queue groups;

controlling each of the queue groups with a separate queue control device, for combining at least each two of the queue groups to form a partner queue group; and controlling the queue groups associated with the partner queue group for transferring a transmission capability from a relevant queue group to one of remaining queue groups in the partner queue group, if no message unit can currently be transmitted from one of the queue groups.

2. The method according to claim 1, which comprises transmitting the message units in the form of message cells in the course of virtual connections, by using an asynchronous transfer mode; and assigning one of the queues to each of the virtual connections.

3. The method according to claim 1, which comprises transmitting the message units in the form of data packets in the course of message streams, by using a packet-switching principle, and assigning one of the queues to each of the message streams.

4. The method according to claim 1, which comprises combining the queues through which message streams of equal priority pass, to form queue groups.

5. A circuit configuration for the transmission of message units associated with message streams of different priority, jointly through one transmission channel, the circuit configuration comprising:

queues each being specific to a respective one of said message streams for conducting said message units associated with said respective message stream;

queue groups formed of said queues combined on the basis of priorities of said message streams each passing through them;

separate queue control devices for controlling each of said queue groups;

at least two of said queue groups each combined to form a partner queue group; and a monitoring device for controlling said queue groups belonging to said partner queue group, to transfer a transmission capability from a relevant queue group to a remaining queue group in said partner queue group, if no message unit can currently be transmitted from one of said queue groups.

6. The circuit configuration according to claim 5, wherein said queues through which said message streams of equal priority pass are combined to form said queue groups.

* * * * *